(12) United States Patent
Tachibana

(10) Patent No.: US 10,849,169 B2
(45) Date of Patent: Nov. 24, 2020

(54) COMMUNICATION APPARATUS FOR CONNECTING TO A WIRELESS NETWORK USING A SIMPLE OPERATION

(71) Applicant: CANON KABUSHIKI KAISHA, Tokyo (JP)

(72) Inventor: Hideaki Tachibana, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/745,892

(22) PCT Filed: Jul. 13, 2016

(86) PCT No.: PCT/JP2016/003311
§ 371 (c)(1),
(2) Date: Jan. 18, 2018

(87) PCT Pub. No.: WO2017/013854
PCT Pub. Date: Jan. 26, 2017

(65) Prior Publication Data
US 2018/0213578 A1 Jul. 26, 2018

(30) Foreign Application Priority Data
Jul. 21, 2015 (JP) .................. 2015-144403

(51) Int. Cl.
*H04W 76/10* (2018.01)
*H04W 12/04* (2009.01)
(Continued)

(52) U.S. Cl.
CPC ........ *H04W 76/10* (2018.02); *G06K 7/10722* (2013.01); *G06K 7/1413* (2013.01);
(Continued)

(58) Field of Classification Search
CPC .. H04W 76/10; H04W 12/06; G06K 7/10722; G06K 7/1413
See application file for complete search history.

(56) References Cited

U.S. PATENT DOCUMENTS

| | | | |
|---|---|---|---|
| 6,185,685 B1 | 2/2001 | Morgan et al. | |
| 8,787,572 B1* | 7/2014 | Tewari | H04L 9/3226 380/255 |

(Continued)

FOREIGN PATENT DOCUMENTS

| | | |
|---|---|---|
| CN | 102291427 A | 12/2011 |
| CN | 102387501 A | 3/2012 |

(Continued)

*Primary Examiner* — Jael M Ulysse
(74) *Attorney, Agent, or Firm* — Canon U.S.A., Inc., IP Division

(57) ABSTRACT

A communication apparatus includes an acquiring unit that acquires information regarding another communication apparatus from a captured image; a determining unit that determines, on the basis of the information acquired by the acquiring unit, whether the other communication apparatus requests a connection using an infrastructure mode based on an IEEE 802.11 standard or requests a connection using Wi-Fi Direct; and a providing unit that provides, to the other communication apparatus, a communication parameter used for a connection requested by the other communication apparatus on the basis of a result of determination by the determining unit.

7 Claims, 7 Drawing Sheets

(51) Int. Cl.
*G06K 7/10* (2006.01)
*G06K 7/14* (2006.01)
*H04W 12/06* (2009.01)
*H04W 84/12* (2009.01)

(52) U.S. Cl.
CPC .... *G06K 7/1417* (2013.01); *H04W 12/04031* (2019.01); *H04W 12/06* (2013.01); *H04W 84/12* (2013.01)

(56) References Cited

U.S. PATENT DOCUMENTS

| | | | |
|---|---|---|---|
| 9,071,967 B1 | 6/2015 | Davies et al. | |
| 9,585,144 B1 | 2/2017 | Shaw et al. | |
| 2004/0068653 A1* | 4/2004 | Fascenda | H04L 63/0853 713/168 |
| 2005/0265286 A1 | 1/2005 | Umemura | |
| 2005/0128304 A1* | 6/2005 | Manasseh | G07C 9/00 348/207.99 |
| 2006/0200854 A1* | 9/2006 | Saito | G06F 21/33 726/2 |
| 2007/0201087 A1 | 8/2007 | Saito | |
| 2007/0239877 A1* | 10/2007 | Uchida | H04L 67/36 709/228 |
| 2010/0027414 A1* | 2/2010 | Hamachi | H04W 48/16 370/216 |
| 2011/0047603 A1* | 2/2011 | Gordon | H04L 63/06 726/5 |
| 2012/0054493 A1* | 3/2012 | Bradley | H04W 12/04 713/171 |
| 2012/0086549 A1* | 4/2012 | Barnes, Jr. | G06Q 10/1053 340/5.61 |
| 2012/0290609 A1* | 11/2012 | Britt | G06Q 30/06 707/769 |
| 2012/0322384 A1* | 12/2012 | Zerr | H04W 4/80 455/41.3 |
| 2013/0034023 A1 | 2/2013 | Jung | |
| 2013/0081121 A1 | 3/2013 | Green et al. | |
| 2013/0148149 A1 | 6/2013 | Park et al. | |
| 2013/0156017 A1 | 6/2013 | Hori et al. | |
| 2013/0170482 A1 | 7/2013 | Jung | |
| 2013/0223361 A1 | 8/2013 | Park et al. | |
| 2013/0318352 A1* | 11/2013 | Ichikawa | H04W 12/06 713/171 |
| 2014/0085666 A1* | 3/2014 | Park | H04W 4/80 358/1.15 |
| 2014/0092425 A1 | 4/2014 | Park | |
| 2014/0185602 A1* | 7/2014 | Goto | H04W 8/005 370/338 |
| 2014/0220939 A1* | 8/2014 | Takae | H04W 12/08 455/411 |
| 2014/0268222 A1 | 9/2014 | Inoue et al. | |
| 2014/0269646 A1 | 9/2014 | Ramasamy et al. | |
| 2014/0310515 A1 | 10/2014 | Kim et al. | |
| 2014/0355063 A1* | 12/2014 | Jang | G06F 3/1236 358/1.15 |
| 2015/0079939 A1* | 3/2015 | Naka | H04W 12/04 455/411 |
| 2015/0332038 A1 | 11/2015 | Ramsden | |
| 2015/0381594 A1 | 12/2015 | Venkatesan et al. | |
| 2016/0072804 A1* | 3/2016 | Chien | H04L 67/16 726/4 |
| 2016/0315923 A1 | 10/2016 | Riscombe-Burton et al. | |

FOREIGN PATENT DOCUMENTS

| | | |
|---|---|---|
| CN | 102547685 A | 7/2012 |
| CN | 102833345 A | 12/2012 |
| CN | 104053193 A | 9/2014 |
| CN | 104219414 A | 12/2014 |
| CN | 104427167 A | 3/2015 |
| CN | 104768055 A | 7/2015 |
| EP | 1887730 A1 | 2/2008 |
| JP | 2006311137 A | 11/2006 |
| JP | 2008-219457 A | 9/2008 |
| JP | 2011199408 A | 10/2011 |
| JP | 2012095191 A | 5/2012 |
| JP | 2013247459 A | 12/2013 |
| JP | 2014-60623 A | 4/2014 |
| JP | 2014-230152 A | 12/2014 |

* cited by examiner

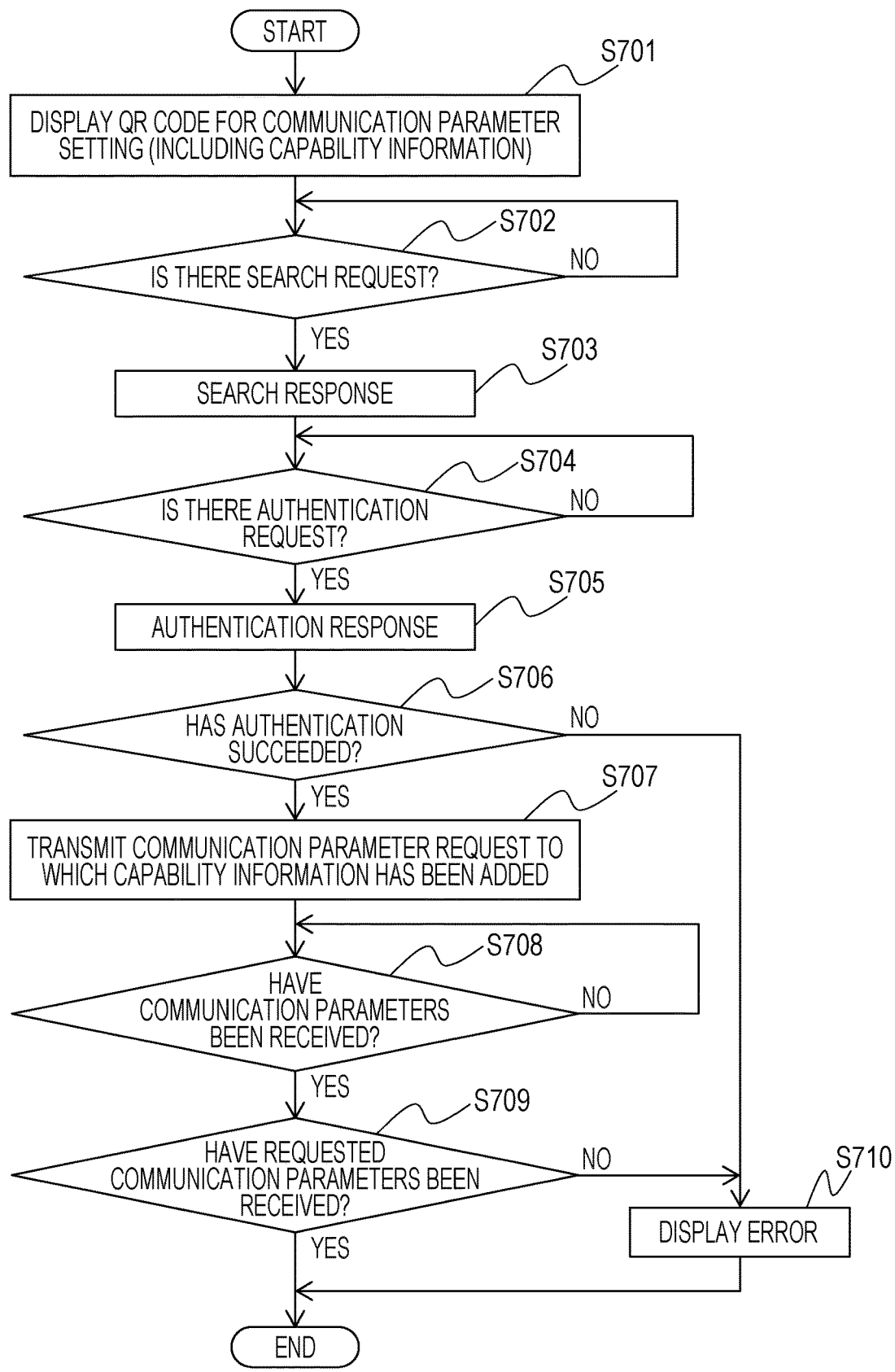

COMMUNICATION APPARATUS FOR CONNECTING TO A WIRELESS NETWORK USING A SIMPLE OPERATION

TECHNICAL FIELD

The present invention relates to a communication technology.

BACKGROUND ART

Recent years have seen more and more electronic devices, such as digital cameras, printers, mobile phones, and smartphones, equipped with wireless communication functions and used by being connected to wireless networks.

To connect such an electronic device to a wireless network, various communication parameters including an encryption method, an encryption key, an authentication method, and an authentication key need to be set. As a technique realizing easy setting of these communication parameters, PTL 1 discloses the following technique. An electronic device causes display of a quick response (QR) code (registered trademark, the same shall apply hereinafter) indicating communication parameters. Then, a mobile terminal reads this QR code by imaging and causes an access point to set the read communication parameters, thereby enabling the electronic device that has displayed the QR code to be connected to the access point.

In order to connect electronic devices directly to each other, connection processing called Wi-Fi Direct (registered trademark, the same shall apply hereinafter) defined by the Wi-Fi Alliance is set as a standard. Wi-Fi Direct includes two roles: a group owner performing a function corresponding to an access point, and a client joining a network established by the group owner. The role of each of the electronic devices performed at the time of communication is determined.

According to PTL 1, communication parameters are set in response to imaging of code information, such as a QR code, in which a large amount of information can be encrypted. Accordingly, it is possible to cause electronic devices to be easily connected to a wireless network while simplifying input by a user.

However, according to PTL 1, it is not possible to optionally select whether an electronic device displaying a QR code is to be connected to a wireless network established by an access point or to a wireless network by using Wi-Fi Direct.

CITATION LIST

Patent Literature

PTL 1: Japanese Patent Laid-Open No. 2014-60623
PTL 2: Japanese Patent Laid-Open No. 2014-230152

SUMMARY OF INVENTION

In view of the above circumstances, the present invention makes it possible for an apparatus to be connected to a desired wireless network by a simple operation.

Accordingly, a communication apparatus according to an embodiment of the present invention includes an acquiring unit that acquires information regarding another communication apparatus from a captured image; a determining unit that determines, on the basis of the information acquired by the acquiring unit, whether the other communication apparatus requests a connection using an infrastructure mode based on an IEEE 802.11 standard or requests a connection using Wi-Fi Direct; and a providing unit that provides, to the other communication apparatus, a communication parameter used for a connection requested by the other communication apparatus on the basis of a result of determination by the determining unit.

In addition, a communication apparatus according to an embodiment of the present invention includes an acquiring unit that acquires information regarding another communication apparatus from a captured image; an authenticating unit that performs authentication processing with the other communication apparatus on the basis of the information acquired by the acquiring unit; a receiving unit that receives a request for a communication parameter from the other communication apparatus if the authentication processing has succeeded; a determining unit that determines, on the basis of the request received by the receiving unit, whether the other communication apparatus requests a connection using an infrastructure mode based on an IEEE 802.11 standard or requests a connection using Wi-Fi Direct; and a providing unit that provides, to the other communication apparatus, a communication parameter used for a connection requested by the other communication apparatus on the basis of a result of determination by the determining unit.

Further features of the present invention will become apparent from the following description of exemplary embodiments with reference to the attached drawings.

BRIEF DESCRIPTION OF DRAWINGS

FIG. 7 is a flowchart illustrating operations of a camera.

DESCRIPTION OF EMBODIMENT

Communication apparatuses according to an embodiment will be described below in detail with reference to the drawings. The following description illustrates an example of using a wireless LAN system conforming to the Institute of Electrical and Electronics Engineers, Inc. (IEEE) 802.11 series. However, the communication scheme is not necessarily limited to the wireless LAN conforming to IEEE 802.11.

Figure 3:
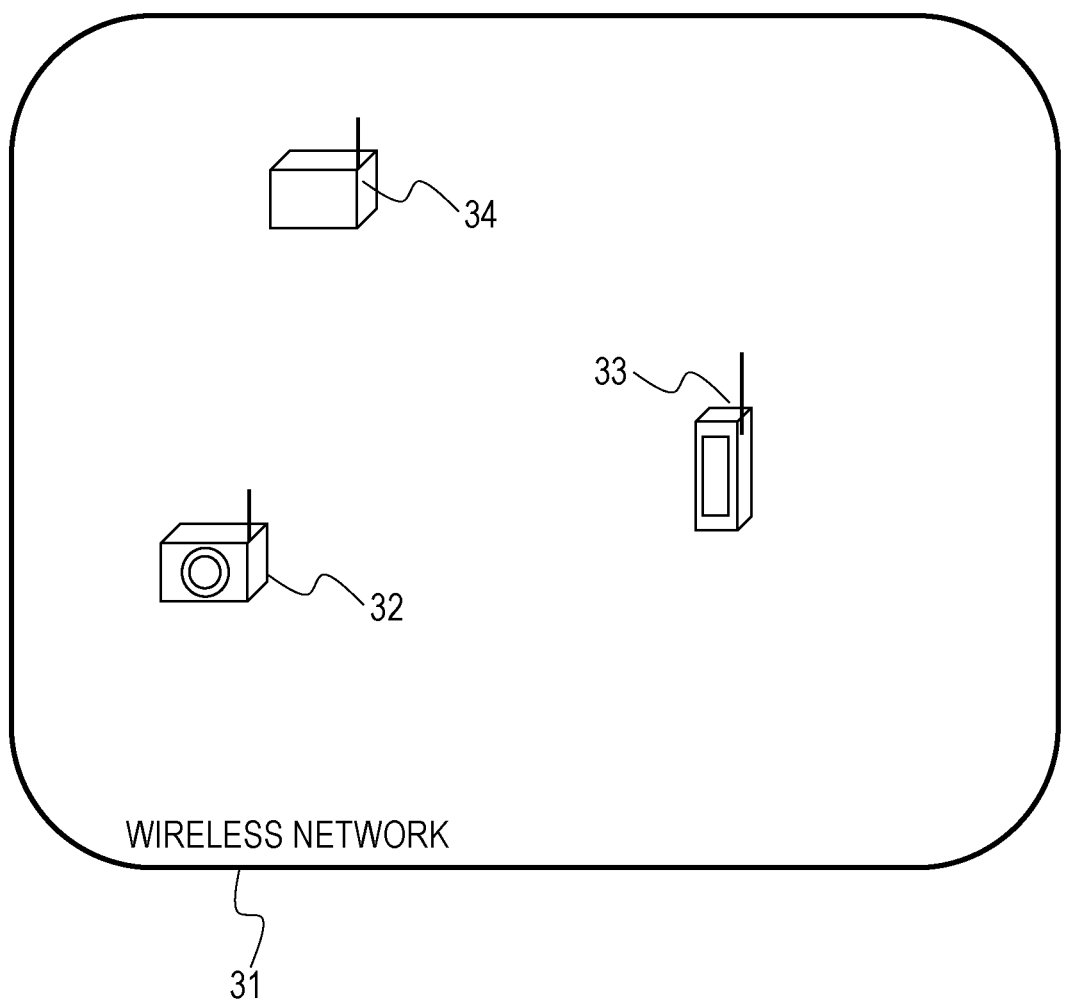
FIG. 3 illustrates an exemplary configuration of a communication system.

FIG. 3 illustrates a communication system according to the embodiment. The communication system illustrated in FIG. 3 includes a camera 32, a smartphone 33, and an access point (hereinafter referred to as AP) 34. Note that a wireless network 31 is a wireless LAN established by the AP 34.

Although the camera 32 and the smartphone 33 are described as communication apparatuses in the communication system according to the embodiment, other communication apparatuses may also be used, such as a printer, a personal computer (PC), a video camera, a smart watch, a personal digital assistant (PDA), and a digital home appliance. In the embodiment, the AP 34 operates as an access point in an infrastructure mode based on the IEEE 802.11 standard. The other apparatuses each operate as a station (STA) in the infrastructure mode based on the IEEE 802.11 standard when being connected to the AP 34.

By using Wi-Fi Direct, the camera 32 and the smartphone 33 can be connected to each other on a wireless LAN established by the camera 32 or the smartphone 33. Wi-Fi Direct is a communication standard defined by the Wi-Fi Alliance and is one of the connection schemes for establishing a wireless LAN connection. In Wi-Fi Direct, a connection sequence to search for another communication apparatus, to form a communication group with the found communication apparatus, and to perform wireless LAN communication is defined. In Wi-Fi Direct, a communication apparatus performing a function corresponding to an access point of a wireless LAN is referred to as a peer-to-peer (P2P) group owner (hereinafter referred to as a GO). In addition, a communication apparatus operating as a station of a wireless LAN and joining the wireless LAN established by the GO is referred to as a P2P client (hereinafter referred to as a CL). That is, in Wi-Fi Direct, the GO is an establishing apparatus that establishes the wireless LAN, and the CL is a joining apparatus that joins the wireless LAN established by the GO. These roles are determined through, for example, role determination processing called Go Negotiation defined in Wi-Fi Direct. Alternatively, information indicating the role to be performed by each of the communication apparatuses may be exchanged in advance by a different method. Each of the communication apparatuses performs a role determined by any of the above methods, and the communication apparatuses are connected to each other wirelessly and perform wireless communication. That is, in Wi-Fi Direct, a plurality of roles are defined, and Wi-Fi Direct includes the role determination processing, i.e., a step for determining roles of the communication apparatuses from among the above roles at the time of communication.

Note that a network established by the GO is referred to as a P2P group in Wi-Fi Direct. A wireless network established by Wi-Fi Direct may also be described herein as a P2P group. The term "P2P group" as described in both of the cases has the same meaning. Note that a GO communication apparatus, a CL communication apparatus, and a communication apparatus whose role is undecided are herein collectively referred to as P2P devices. A P2P device can join a wireless network (have a CL function) and can also establish a wireless network (have a GO function). In a case of connecting the communication apparatuses to each other by using Wi-Fi Direct, communication parameters are provided from the GO to the CL, and connection is established therebetween by using the communication parameters. The communication parameters include various wireless communication parameters used to perform wireless communication conforming to the IEEE 802.11 standard. That is, the communication parameters include wireless communication parameters necessary to perform wireless LAN communication, such as a service set identifier (SSID) as a network identifier, an encryption method, an encryption key, an authentication method, and an authentication key. The communication parameters may further include a media access control (MAC) address, an internet protocol (IP) address for performing communication in the IP layer, and the like.

In Wi-Fi Direct, as a search method for searching for another communication apparatus, a search is performed while switching between a Scan Phase and a Find Phase. During the Find Phase, a search is repeatedly performed while switching between a Listen State and a Search State at a random timing. In a case of executing Wi-Fi Direct in a 2.4 GHz band, during the Scan Phase, to search for an AP or a GO, a search signal is transmitted (or a beacon signal is scanned) sequentially on channels 1 to 13 (which differ by country), which are all usable channels. Then, the Scan Phase transitions to the Find Phase in which a search is performed while switching between the Listen State and the Search State. During the Listen State, a search signal transmitted from another communication apparatus is received on any one of channels 1, 6, and 11, which are discontinuous channels among the channels 1 to 13. After operating in the Listen State for a certain period, the Listen State transitions to the Search State in which the search signal is then transmitted sequentially on three channels only, channels 1, 6, and 11, among all of the channels 1 to 13. Thus, another communication apparatus operating in the Listen State is searched for.

In the above manner, in Wi-Fi Direct, the search signal is transmitted on some channels only, instead of being transmitted constantly on all the channels. Accordingly, it is possible to shorten a time taken to find another communication apparatus, and it is possible to efficiently find the other communication apparatus.

As described above, communication apparatuses (e.g., a camera and a smartphone) in the communication system according to the embodiment can perform at least communication by using an infrastructure mode based on the IEEE 802.11 standard and communication by using Wi-Fi Direct. In the communication system according to the embodiment, the state where a camera and a smartphone perform communication by using the infrastructure mode means the state where the camera and the smartphone perform communication through the AP 34. On the other hand, in the communication system according to the embodiment, the state where a camera and a smartphone perform communication by using Wi-Fi Direct means the state where the camera and the smartphone perform direct communication without the AP 34. That is, in the embodiment, a connection using the infrastructure mode indicates a connection scheme in which a communication apparatus joins a network established by an AP dedicated device and performs communication with another communication apparatus through the AP dedicated device. On the other hand, a connection using Wi-Fi Direct indicates a connection scheme in which a communication apparatus performs direct communication with another communication apparatus without the AP dedicated device.

Figure 1:
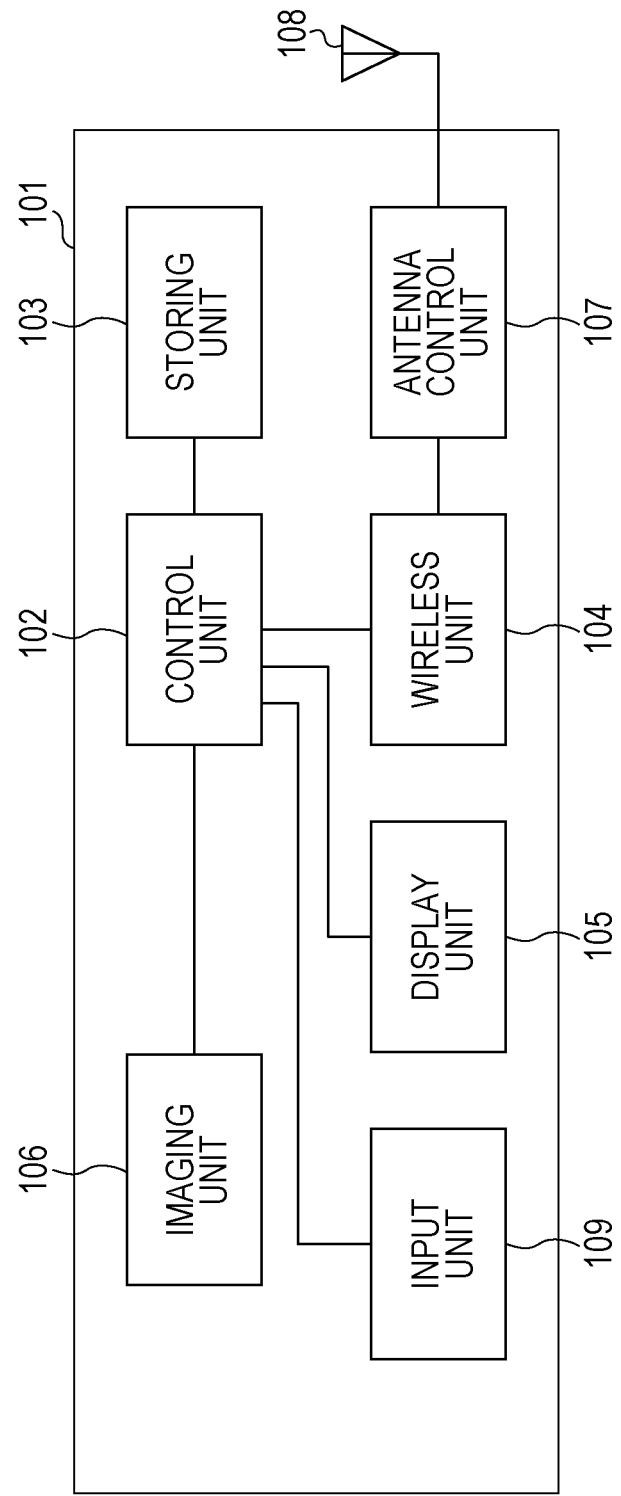
FIG. 1 illustrates a configuration of a communication apparatus.

Next, a hardware configuration of each of the communication apparatuses in the communication system illustrated in FIG. 3 according to the embodiment will be described with reference to FIG. 1. FIG. 1 illustrates an overall communication apparatus 101. A control unit 102 controls the overall communication apparatus 101 by executing a control program stored in a storing unit 103. The control unit 102 is formed of a central processing unit (CPU), for example. The storing unit 103 stores various kinds of information, such as the control program executed by the control unit 102, image data, and communication parameters. Various operations described later are performed by the control unit 102 executing the control program stored in the storing unit 103. The storing unit 103 is formed of a storage medium, such as a read-only memory (ROM), a random access memory (RAM), a hard disk drive (HDD), a flash memory, or a detachable secure digital (SD) card.

A wireless unit 104 is used to perform wireless LAN communication conforming to the IEEE 802.11 series. The wireless unit 104 is formed of a chip that performs wireless communication. A display unit 105 performs various kinds of display and has a function capable of outputting visually recognizable information, such as a function of a liquid crystal display (LCD) or a light emitting diode (LED), or a function capable of outputting sound, such as a function of a speaker. The display unit 105 has a function of outputting at least one of visual information and sound information. In the case where visual information is to be displayed, the display unit 105 includes a video RAM (VRAM) that stores image data corresponding to the visual information to be displayed. The display unit 105 performs display control in such a manner that the LCD or LED keeps displaying the image data stored in the VRAM. An imaging unit 106 is formed of an image sensor, a lens, and the like to take a photograph or shoot a moving image. The imaging unit 106 reads code information of a barcode or a two-dimensional code such as a QR code. An antenna control unit 107 controls output from an antenna 108. The antenna 108 can perform communication in a 2.4 GHz band and/or a 5 GHz band in order to perform communication on a wireless LAN. A user inputs various kinds of information and the like by using an input unit 109 in order to operate the communication apparatus 101. The input unit 109 causes a memory, such as the storing unit 103, to store a flag corresponding to the input information.

Figure 2:
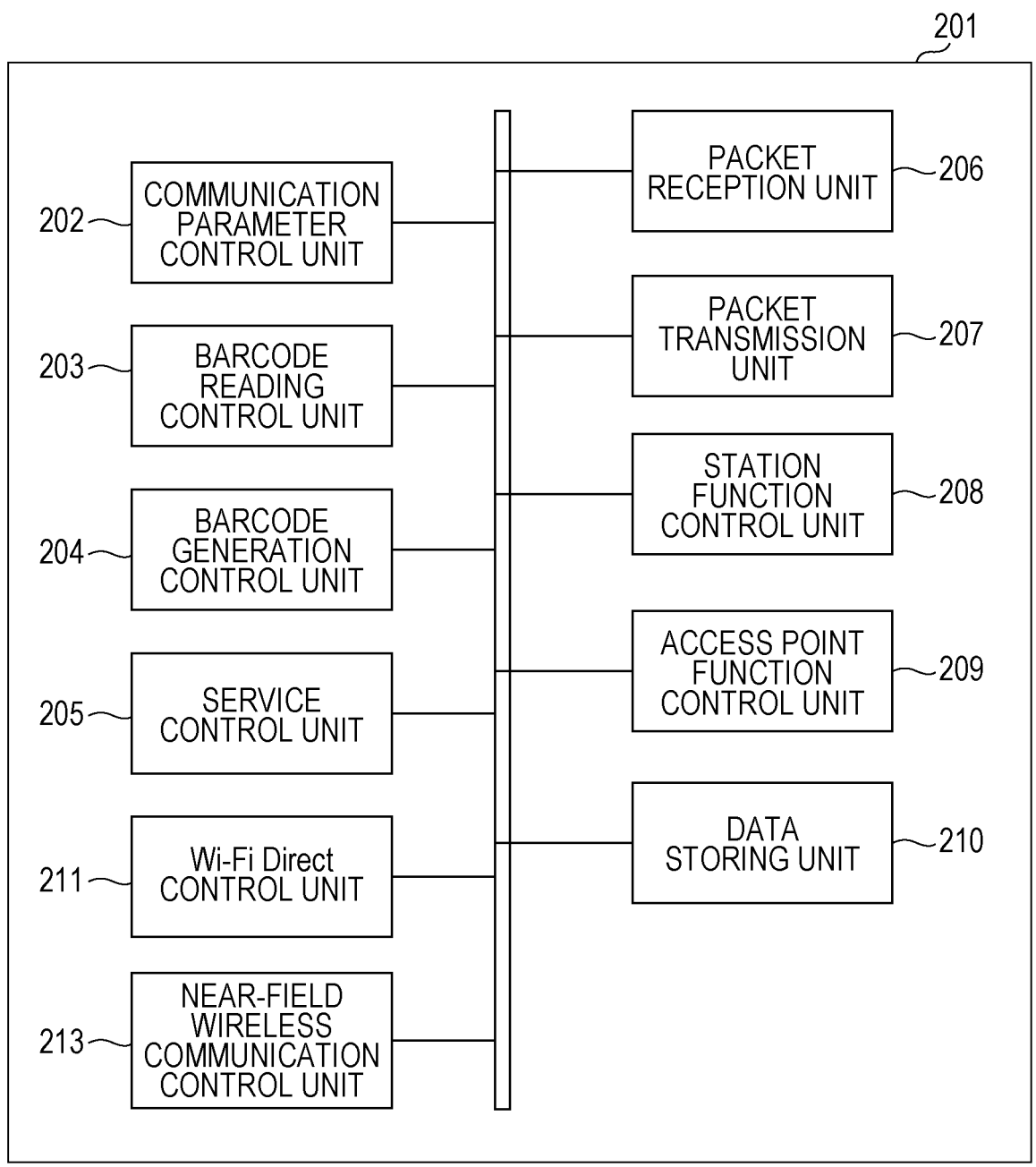
FIG. 2 illustrates a software functional configuration of the communication apparatus.

FIG. 2 is a block diagram illustrating an exemplary configuration of software functional blocks that execute a communication control function included in each of the communication apparatuses illustrated in FIG. 3. In the embodiment, each of the functional blocks of each of the communication apparatuses is stored in a corresponding storing unit 103 as a program, and the functions of each of the communication apparatuses are performed by a corresponding control unit 102 executing the program. The control unit 102 realizes each function by controlling each piece of hardware and calculating and processing information in accordance with the control program. Note that some or all of the functional blocks may be realized as hardware. In this case, some or all of the functional blocks are formed as an application specific integrated circuit (ASIC), for example.

FIG. 2 illustrates an overall software functional block 201. A communication parameter control unit 202 performs communication parameter sharing processing for sharing communication parameters between the communication apparatuses. In the communication parameter sharing processing, a providing apparatus provides communication parameters for performing wireless communication to a receiving apparatus, and thus, communication parameters are shared between the providing apparatus and the receiving apparatus. Here, as described above, the communication parameters include wireless communication parameters necessary to perform wireless LAN communication, such as an SSID as a network identifier, an encryption method, an encryption key, an authentication method, and an authentication key. The communication parameters may further include a MAC address, a pass phrase, an IP address for performing communication in the IP layer, and information necessary for high-layer services. The communication parameter sharing processing performed by the communication parameter control unit 202 may be Wi-Fi Protected Setup (WPS) defined by the Wi-Fi Alliance. The communication parameter sharing processing performed by the communication parameter control unit 202 may be performed in such a manner that communication parameters are safely transferred by using a public key encryption method. A barcode reading control unit 203 analyzes the image captured by the imaging unit 106 to acquire encoded code information. The barcode reading control unit 203 performs processing for analyzing code information of a barcode, a two-dimensional code such as a QR code, or the like. A barcode generation control unit 204 generates the code information of a barcode, a two-dimensional code such as a QR code, or the like and performs control in order to display the generated code information on the display unit 105. The barcode generation control unit 204 causes display of the QR code in which information necessary for communication parameter setting is encoded. A service control unit 205 is a service control unit in the application layer. The application layer here means a service providing layer in a high layer that is Layer 5 or higher in an open systems interconnection (OSI) reference model. That is, the service control unit 205 performs printing processing, image streaming processing, file transfer processing, and the like by using wireless communication performed by the wireless unit 104. A packet reception unit 206 and a packet transmission unit 207 control transmission and reception of various packets including a high-layer communication protocol. The packet reception unit 206 and the packet transmission unit 207 control the wireless unit 104 in order to transmit and receive packets conforming to the IEEE 802.11 standard to and from another communication apparatus. A station (STA) function control unit 208 provides an STA function for operating as an STA in an infrastructure mode defined in the IEEE 802.11 standard. The STA function control unit 208 performs authentication and encryption processing, for example, when operating as an STA. An access point (AP) function control unit 209 provides an AP function for operating as an AP in an infrastructure mode defined in the IEEE 802.11 standard. The AP function control unit 209 establishes a wireless network, performs authentication and encryption processing with respect to the STA, and manages the STA, for example. A data storing unit 210 controls software and controls writing and reading of communication parameters, code information, and the like to and from the storing unit 103. A Wi-Fi Direct control unit 211 performs various kinds of processing based on the above-described Wi-Fi Direct. In the case where a communication apparatus including the Wi-Fi Direct control unit 211 operates as a GO, the Wi-Fi Direct control unit 211 performs control in such a manner that the communication apparatus serves as an AP by using the AP function control unit 209; in the case where the communication operates as a CL, the Wi-Fi Direct control unit 211 performs control in such a manner that the communication apparatus serves as an STA by using the STA function control unit 208. A near-field wireless communication control unit 213 controls near-field wireless communication using near-field communication (NFC), Bluetooth (registered trademark, the same shall apply hereinafter), or the like.

The above functional blocks are examples, and a plurality of functional blocks may realize a single functional block, or any one of the functional blocks may be further divided into blocks performing a plurality of functions.

Figure 4:
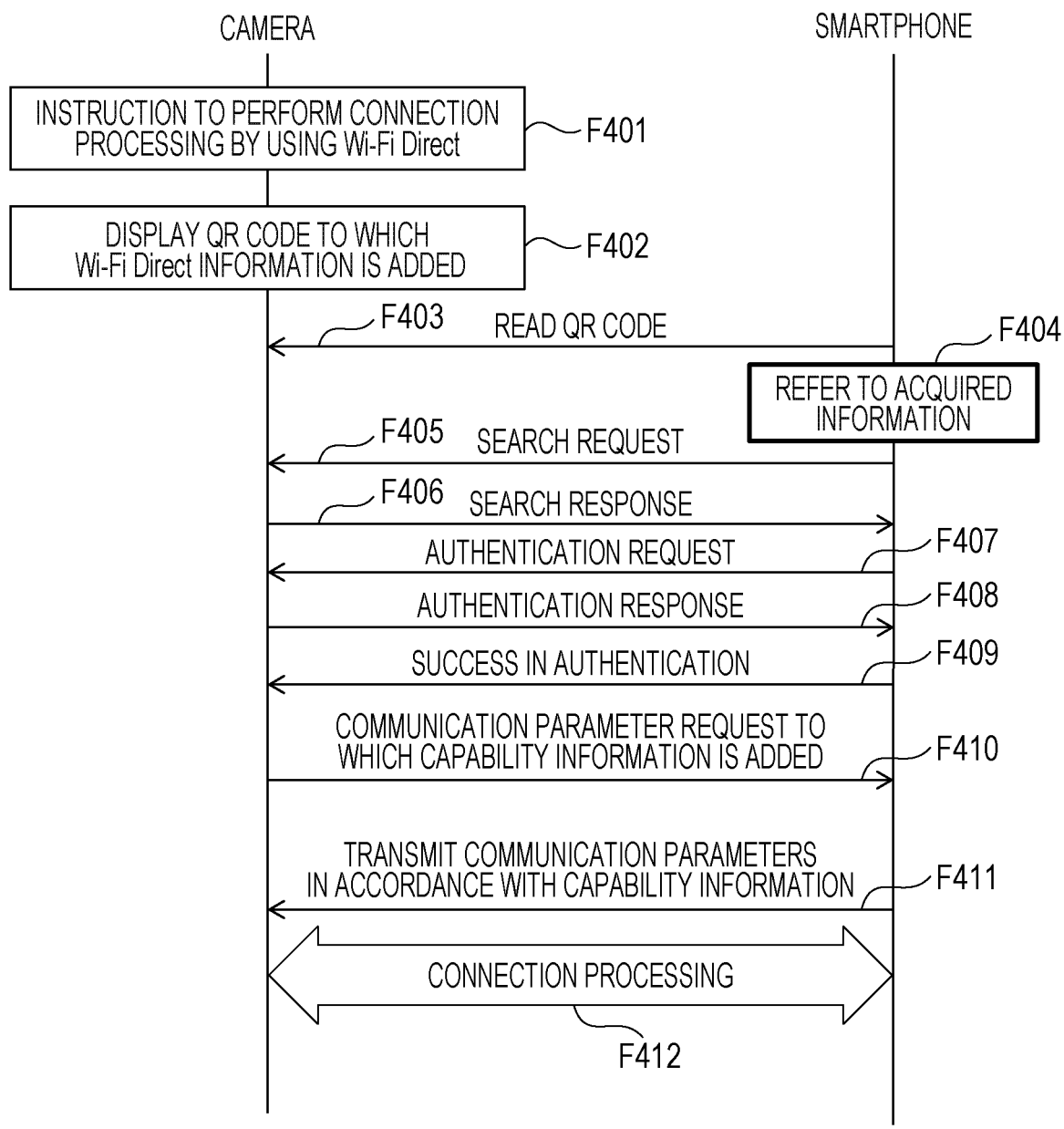
FIG. 4 illustrates an exemplary sequence in the communication system.

The communication system having the above configuration operates as follows. The following description illustrates operations in which the smartphone 33 images a QR code displayed by the camera 32, the smartphone 33 provides communication parameters to the camera 32 by using the information of the imaged QR code, and the camera 32 becomes connected to a desired wireless network. FIG. 4 is a sequence chart illustrating a process of each of the communication apparatuses in the case where the camera 32 displaying the QR code requests a connection using Wi-Fi Direct.

Referring to FIG. 4, in response to the starting of a communication parameter setting mode for performing communication parameter sharing processing, the camera 32 performs display for allowing a user to select a connection scheme. For example, the camera 32 displays choices such as "Wi-Fi Direct connection" and "AP connection" so as to allow the user to select the connection scheme. It is assumed in the example of FIG. 4 that the camera 32 receives an instruction to execute Wi-Fi Direct from the input unit 109 (F401). Upon reception of the instruction to execute Wi-Fi Direct, the camera 32 causes display of a QR code for Wi-Fi Direct on the display unit 105 (F402). The QR code for Wi-Fi Direct is a QR code in which information necessary to perform communication parameter setting and information for specifying Wi-Fi Direct are encoded. The information for specifying Wi-Fi Direct is a piece of capability information as information that can be included in a QR code. Note that, examples of other capability information may include information regarding roles (whether the role is a GO or a CL) performed at the time of executing Wi-Fi Direct and an Intent value used for negotiation processing for determining the GO in Wi-Fi Direct among the communication apparatuses. Examples of the capability information may further include information regarding a service that can be provided from the camera 32, such as information as to whether or not a file transmission and reception function is included, information as to whether or not a printing function is included, and information as to whether or not a server or client function is included. In addition, details of a service requested by the camera 32, such as printing, file transmission and reception, or display of a moving image, and the type of a communication apparatus, such as a printer or camera, to which the camera 32 desires to be connected may also be included. The camera 32 may have such a configuration in which, if the communication parameter setting mode has started, whether to display a QR code or to image a QR code of another communication apparatus is selected by user operation. In the example illustrated in FIG. 4, it is assumed that the user instructs the camera 32 to display a QR code. Examples of the information necessary to perform communication parameter setting, the information being included in the QR code, include information used for encryption at the time of transmitting communication parameters and identification information of a communication apparatus. The information used for encryption at the time of transmitting communication parameters may be a public key or a certificate. As a method for encrypting and transmitting communication parameters by using a public key at the time of communication parameter sharing processing, for example, it is sufficient to use the method disclosed in PTL 2. The identification information of the communication apparatus may be a MAC address or a universally unique identifier (UUID) for uniquely identifying the communication apparatus. The information necessary to perform communication parameter setting may be an identifier indicating communication parameter sharing processing. In addition, identification information of a one-time password scheme using a QR code, for example, may also be included.

In response to the starting of the communication parameter setting mode by user operation, the smartphone 33 transitions to a state where imaging by using the imaging unit 106 is possible. The smartphone 33 may have such a configuration in which, if the communication parameter setting mode has started, whether to display a QR code or to image a QR code of another communication apparatus is selected by user operation. It is assumed in the example of FIG. 4 that the user instructs the smartphone 33 to image a QR code. Upon transition to a state where imaging is possible, the smartphone 33 reads, by using the imaging unit 106 of the smartphone 33, the QR code displayed by the camera 32 (F403). The smartphone 33 decrypts and analyzes the read QR code and acquires information indicated by the QR code. The smartphone 33 then determines whether or not the information acquired from the QR code is the information necessary to perform communication parameter setting and determines whether or not the QR code includes a request regarding a connection scheme (F404). If the QR code does not include the information necessary to perform communication parameter setting, the smartphone 33 may end the process as an error. If it is not possible to realize a connection requested according to the capability information included in the QR code of the camera 32, the process may also end as an error. To end the process as an error, the smartphone 33 may display information indicating the error on the display unit 105. If the imaged QR code includes the information necessary to perform communication parameter setting, the smartphone 33 starts apparatus search processing by using the wireless unit 104 (F405). During the apparatus search processing, the smartphone 33 may transmit, by unicast transmission, a search request signal specifying an apparatus indicated by the identification information included in the QR code acquired through imaging. For the search request signal, a Probe Request message or action frame based on the IEEE 802.11 standard may be used. Although the smartphone 33 transmits a search request in the example of FIG. 4, the camera 32 may transmit the search request after F402 (F405). In response to the search request in F405, the camera 32 transmits a search response from the wireless unit 104 as a reply (F406). Then, the smartphone 33 performs authentication processing with the camera 32 found through the apparatus search processing. Specifically, the smartphone 33 transmits, from the wireless unit 104, an authentication request by using public key information acquired in F403 (F407). Similarly, the camera 32 transmits, from the wireless unit 104, an authentication response by using the public key information (F408). The smartphone 33 checks the authentication on the basis of the information received in F408, and if the authentication has succeeded, the smartphone 33 transmits a message indicating the success in authentication to the camera 32 (F409).

Then, the camera 32 transmits, to the smartphone 33, a communication parameter request to which the capability information has been added. Note that the capability information can alternatively be included in the QR code generated in F402. Accordingly, if the capability information included in the QR code has already been exchanged in F402, the capability information is not necessarily added to the communication parameter request in F410 (F410). The smartphone 33 refers to the received communication parameter request. If the capability information has been added to the communication parameter request, the smartphone 33 checks details of the capability information. That is, in the embodiment, the smartphone 33 is notified of the capability information including at least information indicating a connection scheme requested by the camera 32 in F403 or F410. The smartphone 33 selects communication parameters used for the connection requested by the camera 32 and transmits the communication parameters to the camera 32 from the wireless unit 104 (F411). Here, if it is not possible to acquire the capability information in either of F403 and F410, the smartphone 33 may transmit all communication parameters that the smartphone 33 is holding or all communication parameters that the smartphone 33 is capable of generating, or may perform error processing. The communication parameters are provided from the smartphone 33 to the camera 32, and thus, the communication parameters are shared therebetween. In response to this, the camera 32 and the smartphone 33 perform connection processing on the basis of the shared communication parameters. In FIG. 4, a connection using Wi-Fi Direct is the connection scheme requested by the camera 32, and accordingly, the camera 32 and the smartphone 33 are connected to each other by using Wi-Fi Direct (F412).

Figure 5:
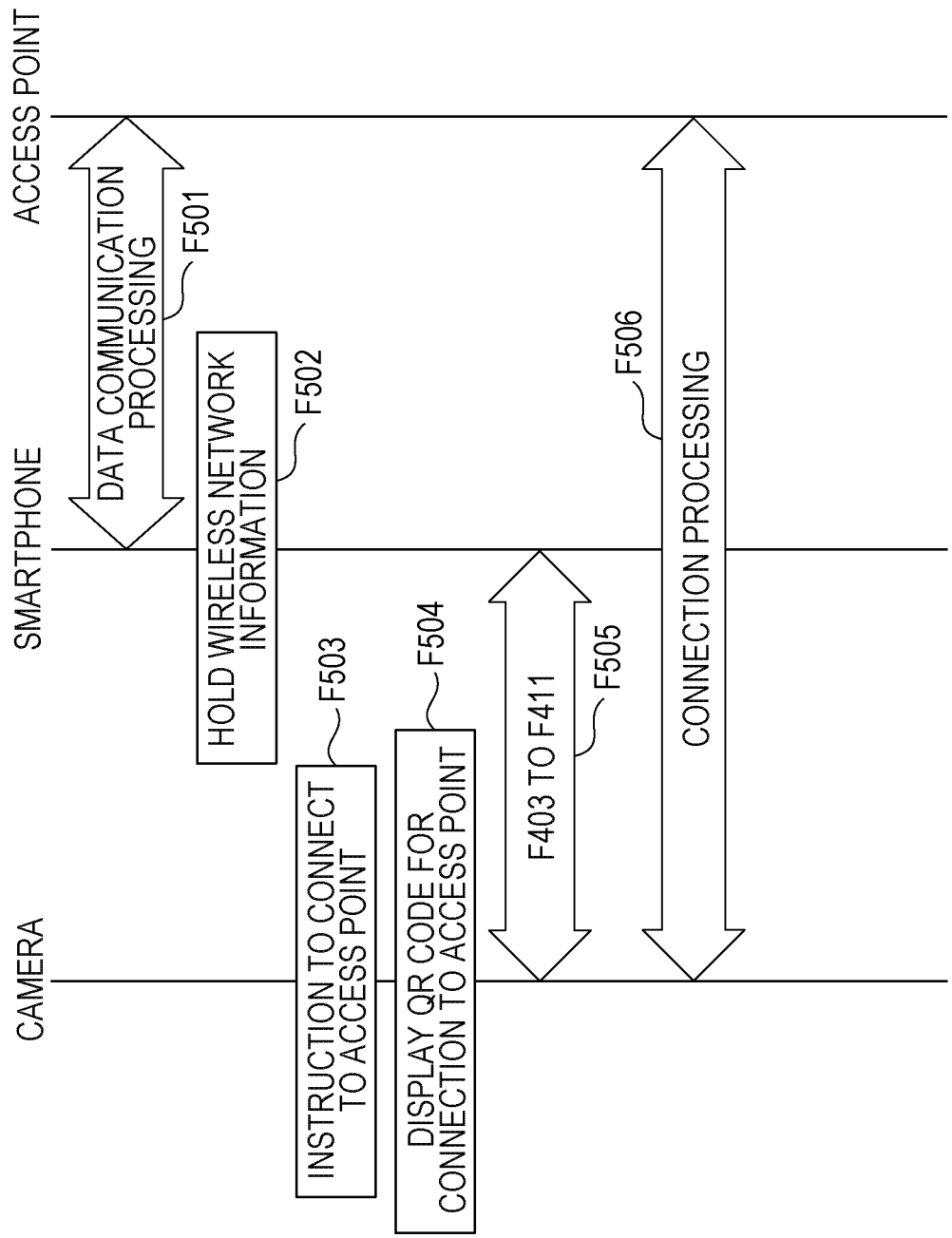
FIG. 5 illustrates an exemplary sequence in the communication system.

FIG. 5 is a sequence chart illustrating a process of each of the communication apparatuses in the case where the camera 32 displaying a QR code requests a connection using an infrastructure mode.

In FIG. 5, the smartphone 33 is connected to the wireless network 31 established by the AP 34 and is performing data communication processing through the AP 34 (F501). The smartphone 33 holds information regarding the wireless network 31 (F502). Specifically, the smartphone 33 holds communication parameters used for a connection to the wireless network 31. In response to the starting of a communication parameter setting mode for performing communication parameter sharing processing, the camera 32 performs display for allowing a user to select connection scheme. For example, as described above, the camera 32 displays choices such as "Wi-Fi Direct connection" and "AP connection" so as to allow the user to select the connection scheme. It is assumed in the example of FIG. 5 that the camera 32 receives an instruction to connect to the AP from the input unit 109 (F503). Upon reception of the instruction to connect to the AP, the camera 32 causes display of a QR code for a connection to the AP on the display unit 105 (F504). Here, the QR code for a connection to the AP is a QR code in which the above-described information necessary to perform communication parameter setting and information for specifying the connection to the AP are encoded. Note that the information for specifying the connection to the AP may be information indicating a connection using an infrastructure mode based on the IEEE 802.11 standard, for example. The information for specifying the connection to the AP is a piece of capability information as information that can be included in the QR code. Note that examples of other capability information can include the above-described various kinds of information. Then, the same processing as that in F403 through F411 of FIG. 4 is performed between the camera 32 and the smartphone 33. Since F403 through F411 have already been described above, a detailed description thereof is omitted. However, in FIG. 5, the capability information indicating that the camera 32 desires to be connected to the AP is added to the QR code displayed by the camera 32. In the case where the smartphone 33 does not hold communication parameters for the connection scheme requested by the camera 32, such as connection parameters used for the connection to the AP, error processing is performed. In FIG. 5, the smartphone 33 holds communication parameters of the AP 34, and accordingly, after the completion of search processing and authentication processing, communication parameters used for the connection to the AP are selected and transmitted to the camera 32 (F505). The camera 32 performs processing for a connection to the AP 34 by using the received communication parameters. In FIG. 5, the connection using the infrastructure mode is the connection scheme requested by the camera 32, and accordingly, the camera 32 and the AP 34 are connected to each other by using a wireless LAN (F506).

Figure 6:
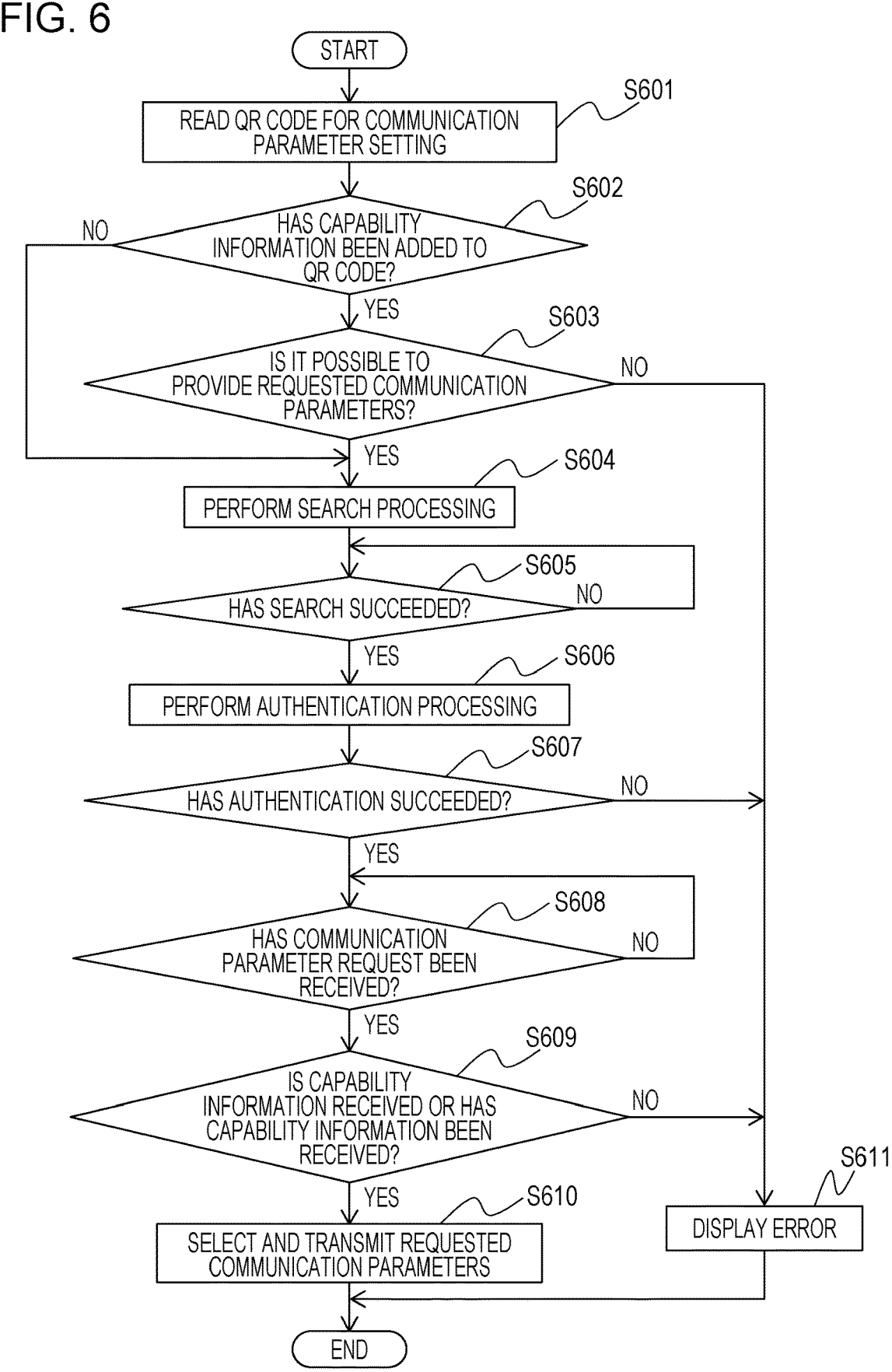
FIG. 6 is a flowchart illustrating operations of a smartphone.

FIG. 6 is a flowchart illustrating a process performed by the smartphone 33 in the embodiment. Each of the steps illustrated in FIG. 6 is performed by the control unit 102 of the smartphone 33 reading and executing a computer program stored in the storing unit 103 of the smartphone 33. Note that some or all of the steps illustrated in FIG. 6 may be realized by hardware, such as an ASIC.

The smartphone 33 images a QR code for communication parameter setting by using the imaging unit 106 (S601). Note that the imaging in S601 may be performed in accordance with user operation or may be performed automatically if it is detected that the QR code is within the angle of view that can be imaged by the imaging unit 106. If the imaged QR code does not include information necessary to perform communication parameter setting, the smartphone 33 may end the process as an error. As described above with reference to FIG. 4, the QR code includes authentication information as the information necessary to perform communication parameter setting and identification information of a communication apparatus. The QR code may further include capability information in some cases. The smartphone 33 decrypts and analyzes the imaged QR code and acquires information indicated by the QR code. The smartphone 33 determines whether or not the information acquired from the QR code is the information necessary to perform communication parameter setting and whether or not the QR code includes the capability information (S602). If it is determined that the QR code includes the capability information, the process transitions to S603; if it is determined that the QR code does not include the capability information, the process transitions to S604. If it is determined that the QR code includes the capability information, the smartphone 33 determines whether or not it is possible to respond to a request indicated by the capability information. Specifically, the smartphone 33 determines whether or not it is possible to provide communication parameters requested by a communication apparatus that has displayed the QR code (S603). For example, if the communication apparatus that has displayed the QR code requests a connection using an infrastructure mode, the smartphone 33 determines whether or not it is possible to provide communication parameters used for a connection to an access point. If the communication apparatus that has displayed the QR code requests a connection using Wi-Fi Direct, the smartphone 33 determines whether or not it is possible to provide communication parameters used for a connection using Wi-Fi Direct. If the communication apparatus that has displayed the QR code requests a specific service, such as a specific printing service, the smartphone 33 determines whether or not it is possible to provide communication parameters necessary to perform communication with a communication apparatus that can provide the requested specific service by using a wireless LAN. If it is possible to provide communication parameters requested by the communication apparatus that has displayed the QR code, the process transitions to S604; if not, the process transitions to S610. In S604, the smartphone 33 performs search processing to search for another communication apparatus (the camera 32 in the embodiment) by using the wireless unit 104. During the search processing, the smartphone 33 may transmit a search request signal specifying a communication apparatus indicated by identification information included in the imaged QR code (S604). Then, the smartphone 33 determines whether or not the search for the other communication apparatus has succeeded (S605). If a timer is set and a predetermined time has passed without a success in finding the other communication apparatus, error processing may be performed, and an error notification may be issued on the display unit 105. If the search for the other communication apparatus has succeeded, the smartphone 33 performs authentication processing with the found other communication apparatus. This authentication processing is performed by using authentication information (e.g., a public key) added to the QR code (S606). The smartphone 33 determines whether or not the authentication processing has succeeded (S607).

If the authentication processing has succeeded, the smartphone 33 transmits a message indicating the success in the authentication processing to the other communication apparatus from the wireless unit 104. Then, it is determined whether or not a communication parameter request transmitted from the other communication apparatus has been received (S608). If a timer is set and a predetermined time has passed without receiving the communication parameter request from the other communication apparatus, error processing may be performed, and an error notification may be issued on the display unit 105. If the communication parameter request has been received, the smartphone 33 determines whether or not the capability information is received or has been received from the other communication apparatus (S609). The capability information is acquired at any of the reading of the QR code in S601 and the receiving of the communication parameter request in S608. If the capability information is not received or has not been received, the smartphone 33 performs error processing (S611) in the embodiment. However, the error processing is not necessarily performed. For example, one or more of communication parameters that the smartphone 33 is capable of generating or communication parameters that the smartphone 33 is storing may be transmitted to the other communication apparatus. If the capability information is received or has been received, the smartphone 33 selects communication parameters corresponding to the connection requested by the other communication apparatus and transmits the communication parameters to the other communication apparatus (S610). If the other communication apparatus desires to perform direct communication subsequently, the smartphone 33 performs connection processing with the other communication apparatus (S610). If it is not possible to provide the requested communication parameters in S603, if the authentication processing has failed in S607, or if the capability information has not been received in S609, the smartphone 33 performs error processing and issues an error notification on the display unit 105.

FIG. 7 is a flowchart illustrating a process performed by the camera 32 in the embodiment. Each of the steps illustrated in FIG. 7 is performed by the control unit 102 of the camera 32 reading and executing a computer program stored in the storing unit 103 of the camera 32. Note that some or all of the steps illustrated in FIG. 7 may be realized by hardware, such as an ASIC.

The camera 32 causes, on the display unit 105, display of a QR code in which information necessary to perform communication parameter setting has been encoded (S701). As described above with reference to FIG. 4, the QR code includes authentication information as the information necessary to perform communication parameter setting and identification information of a communication apparatus. The QR code may also include capability information. The camera 32 determines whether or not a search request signal has been received from another communication apparatus (the smartphone 33 in the embodiment) (S702). If a timer that counts the time from the display of the QR code is set and a predetermined time has passed without receiving the search request signal from the other communication apparatus, error processing may be performed, and an error notification may be issued on the display unit 105. The camera 32 may also transmit a search request signal. If the search request signal has been received, the camera 32 transmits a search response to the other communication apparatus that has transmitted the search request signal (S703). Then, the camera 32 determines whether or not an authentication request has been received from the other communication apparatus (S704). If a timer is set and a predetermined time has passed without receiving the authentication request from the other communication apparatus, error processing may be performed, and an error notification may be issued on the display unit 105. If the authentication request has been received, the camera 32 transmits an authentication response to the other communication apparatus from the wireless unit 104 (S705). Note that the authentication processing performed here is performed by using authentication information (e.g., a public key) added to the QR code. The camera 32 determines whether or not the authentication processing has succeeded (S706). This determination is performed on the basis of whether or not a message indicating the success in the authentication processing has been received from the other communication apparatus. If the authentication processing has succeeded, the camera 32 transmits, to the other communication apparatus, a communication parameter request to which capability information has been added (S707). Note that the capability information may be included in the QR code generated in S701. If the capability information has already been included in the QR code in S701, the capability information is not necessarily added in S707. The camera 32 determines whether or not communication parameters have been received from the other communication apparatus (S708). If a timer is set and a predetermined time has passed without receiving the communication parameters from the other communication apparatus, the camera 32 may perform error processing and may issue an error notification on the display unit 105. If the communication parameters have been received from the other communication apparatus, the camera 32 determines whether or not requested communication parameters have bene received (S709). In this example, it is determined whether or not communication parameters corresponding to the capability information transmitted to the other communication apparatus have been received. For example, if the camera 32 has requested a connection using an infrastructure mode, it is determined whether or not communication parameters used for a connection to an access point have been received. On the other hand, if the camera 32 has requested a connection using Wi-Fi Direct, it is determined whether or not communication parameters used for a connection to the other communication apparatus by using Wi-Fi Direct have been received.

If requested communication parameters have been received, the camera 32 performs connection processing by using the communication parameters. If requested communication parameters have not been received, the camera 32 performs error processing and issues an error notification on the display unit 105 (S710).

In the communication system according to the embodiment, as described above, the camera that requests a connection to a wireless LAN displays a QR code, and the smartphone images the QR code. Accordingly, it is possible to easily connect the camera to the wireless LAN. Furthermore, it is possible to provide appropriate communication parameters depending on whether the camera requests a connection using an infrastructure mode, i.e., a connection to an access point, or a connection using Wi-Fi Direct.

Other Embodiments

The above embodiment has illustrated the configurations in which information for performing communication parameter setting by using a QR code image is exchanged between communication apparatuses. However, instead of imaging a QR code, wireless communication using near-field communication (NFC), Bluetooth, or the like may be used. Alternatively, wireless communication using IEEE 802.11ad, TransferJet (registered trademark), or the like may be used.

Note that the QR code to be read may be a QR code adhered to or directly described on a communication apparatus itself or an accessory of a communication apparatus, such as an instruction manual or wrapping, such as a corrugated cardboard used at the time of selling a communication apparatus. In this case, different QR codes are prepared depending on the connection scheme. In addition, the QR code may be replaced by a one-dimensional barcode or a two-dimensional code other than a QR code. Instead of machine readable information, such as a QR code, information that can be read by a user may be used.

Although the above embodiment has illustrated the case where the communication apparatuses perform wireless LAN communication conforming to the IEEE 802.11 standard, the communication is not limited thereto. For example, communication may be performed by using a wireless communication medium of a wireless universal serial bus (USB), Multiband Orthogonal Frequency Division Multiplexing (OFDM) Alliance (abbreviated to MBOA), Bluetooth, ultra wide band (UWB), ZigBee, NFC, or the like. The UWB includes a wireless USB, wireless 1394, and WiMedia Network (WiNET).

Embodiments of the present invention can also be realized by supplying a program realizing one or more functions of the above embodiments to a system or apparatus through a network or a storage medium and reading and executing the program by using one or more processors in a computer of the system or apparatus. Embodiments of the present invention can also be realized by a circuit (e.g., ASIC) realizing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-144403, filed Jul. 21, 2015, which is hereby incorporated by reference herein in its entirety.

The invention claimed is:

1. A communication apparatus comprising:
   one or more processors; and
   one or more memories storing code to be executed by the one or more processors, when executed by the one or more processors, cooperating to act as:
   a capturing unit configured to capture an image associated with other communication apparatus;
   a determining unit that determines, on the basis of information acquired from the image captured by the capturing unit, whether the other communication apparatus requests a connection using an infrastructure mode based on an IEEE 802.11 standard or requests a connection using Wi-Fi Direct;
   a selecting unit that selects a communication parameter for connecting by using the infrastructure mode in a case where the determining unit determines that the other communication apparatus requests a connection using the infrastructure mode and selects a communication parameter for connecting by using Wi-Fi Direct in a case where the determining unit determines that the other communication apparatus requests a connection using Wi-Fi Direct; and
   a providing unit that provides, to the other communication apparatus, the communication parameter selected by the selecting unit.

2. The communication apparatus according to claim 1, wherein, if the determining unit determines that the other communication apparatus requests the connection using the infrastructure mode based on the IEEE 802.11 standard, the providing unit provides a communication parameter used for a connection to a wireless local area network established by an access point different from the communication apparatus.

3. The communication apparatus according to claim 1, wherein, if the determining unit determines that the other communication apparatus requests the connection using Wi-Fi-Direct, the providing unit provides a communication parameter used for a connection using Wi-Fi Direct between the communication apparatus and the other communication apparatus.

4. The communication apparatus according to claim 1, wherein the image includes any of a barcode and a two-dimensional code.

5. The communication apparatus according to claim 1, wherein the communication parameter includes at least any one of a service set identifier, an encryption key, an encryption method, an authentication key, and an authentication method.

6. A communication method comprising:
   capturing an image associated with other communication apparatus;
   determining, on the basis of information acquired from the image captured, whether the communication apparatus requests a connection using an infrastructure mode based on an IEEE 802.11 standard or requests a connection using Wi-Fi Direct;

selecting a communication parameter for connecting by using the infrastructure mode in a case where it is determined that the communication apparatus requests a connection using the infrastructure mode and selects a communication parameter for connecting by using Wi-Fi Direct in a case where it is determined that the communication apparatus requests a connection using Wi-Fi Direct; and providing, to the communication apparatus, the communication parameter selected.

7. A non-transitory computer-readable storage medium storing a computer program for causing a computer to execute a communication method, the communication method comprising:

capturing an image associated with other communication apparatus;

determining, on the basis of information acquired from the image captured, whether the other communication apparatus requests a connection using an infrastructure mode based on an IEEE 802.11 standard or requests a connection using Wi-Fi Direct;

selecting a communication parameter for connecting by using the infrastructure mode in a case where it is determined that the other communication apparatus requests a connection using the infrastructure mode and selects a communication parameter for connecting by using Wi-Fi Direct in a case where it is determined that the other communication apparatus requests a connection using Wi-Fi Direct; and providing, to the other communication apparatus, the communication parameter selected.

* * * * *